US012794369B2

(12) United States Patent
Sahu et al.

(10) Patent No.: US 12,794,369 B2
(45) Date of Patent: Nov. 10, 2026

(54) AUDIBLE NOISE PREVENTION METHOD FOR POWER CONVERSION SYSTEM

(71) Applicant: Reed Semiconductor Corporation, Warwick, RI (US)

(72) Inventors: Biranchinath Sahu, Bangalore (IN); Umang Bhadreshkumar Shah, Bengaluru (IN)

(73) Assignee: Reed Semiconductor Corporation, Warwick, RI (US)

( * ) Notice: Subject to any disclaimer, the term of this patent is extended or adjusted under 35 U.S.C. 154(b) by 229 days.

(21) Appl. No.: 18/919,616

(22) Filed: Oct. 18, 2024

(65) Prior Publication Data

US 2026/0112969 A1 Apr. 23, 2026

(51) Int. Cl.

| | |
|---|---|
| ***H02M 3/158*** | (2006.01) |
| ***H02M 1/00*** | (2006.01) |
| ***H02M 1/08*** | (2006.01) |
| ***H02M 3/156*** | (2006.01) |

(52) U.S. Cl.

CPC ......... *H02M 3/158* (2013.01); *H02M 1/0032* (2021.05); *H02M 1/08* (2013.01); *H02M 3/156* (2013.01)

(58) Field of Classification Search

CPC .... H02M 3/156; H02M 3/158; H02M 1/0032; H02M 1/08

See application file for complete search history.

(56) References Cited

U.S. PATENT DOCUMENTS

| | | | | |
|---|---|---|---|---|
| 2012/0133348 A1* | 5/2012 | Fan | H02M 3/1588 323/284 |
| 2022/0209669 A1* | 6/2022 | Sharifi | H02M 3/1563 |
| 2024/0128866 A1* | 4/2024 | Villar Piqué | H02M 1/0003 |

* cited by examiner

*Primary Examiner* — Lakaisha Jackson

(74) *Attorney, Agent, or Firm* — AP3 Law Firm PLLC

(57) ABSTRACT

A method includes configuring a power conversion system to operate in a discontinuous conduction mode, wherein the power conversion system comprises a power conversion apparatus connected between an input voltage bus and an output voltage bus, and a controller electrically coupled to the power conversion apparatus, detecting a switching frequency of the power conversion apparatus, and turning on a low-side switch of the power conversion apparatus once the switching frequency of the power conversion apparatus is less than a predetermined audio frequency threshold.

20 Claims, 5 Drawing Sheets

AUDIBLE NOISE PREVENTION METHOD FOR POWER CONVERSION SYSTEM

TECHNICAL FIELD

The present disclosure relates generally to the field of power conversion systems, and in particular embodiments, to techniques and mechanisms for reducing audible noise in a power conversion system.

BACKGROUND

Power converters (e.g., buck power converters) are widely used to provide regulated output voltages from variable input voltages. These regulators typically use power switches driven by pulse signals to control the transfer of energy between the input and output. Voltage regulation is achieved through the adjustment of either the frequency of the pulses or the width of the pulses. This first one is known as Pulse Frequency Modulation (PFM). The second one is known as Pulse Width Modulation (PWM).

In a PWM operating mode, the width of the pulses is adjusted to maintain a stable output voltage. In contrast, in a PFM operating mode, both the frequency and duty cycle are varied, especially during light load conditions. In operation, depending on operating conditions, power converters can operate in Continuous Conduction Mode (CCM). In CCM, the power switches are turned on and off at a fixed frequency with a variable duty cycle. When load current decreases below a threshold, the power converter is configured to operate in Discontinuous Conduction Mode (DCM). In DCM, the power switches are turned off as the inductor current falls to zero. In light load operating conditions, the switching frequency of the power converter may continue to drop below the set frequency in order to maintain voltage regulation.

One significant drawback of configuring the power converter to operate in DCM is that, as the load decreases, the switching frequency can fall into the audio frequency range, typically between about 20 Hz and about 20 kHz, resulting in the generation of audible noise. This noise is undesirable, particularly in environments where low acoustic noise is crucial, and the issue is exacerbated in systems that frequently operate under light load conditions.

As technologies further advance, a variety of processors such as Digital Signal Processors (DSPs), Field Programmable Gate Arrays (FPGAs), Central Processing Units (CPUs) and/or the like, have become popular. Each processor operates with a low supply voltage (e.g., sub-1V) and consumes a large amount of current. These advanced processors require fast transient response from power supplies to maintain stable operation during rapid changes in workload and power demand. A fast transient response ensures that voltage regulation is maintained within tight tolerances, enabling processors to function efficiently and reliably, especially during critical computational tasks or high-speed operations.

A known approach to address this issue is the use of constant on-time control in power converters, which provides benefits like fast transient response to changes in load and line conditions. However, as the load decreases and the converter transitions into DCM, the switching frequency can continue to decrease below the target frequency to maintain voltage regulation. This reduction may result in the switching frequency entering the audio range, potentially generating audible noise. Thus, there is a need for a control method that prevents the power converter from operating within the audio frequency range. The present disclosure addresses this requirement.

SUMMARY

Technical advantages are generally achieved, by embodiments of this disclosure which describe a control method for reducing audible noise in a power conversion system.

In accordance with one aspect of the present disclosure, a method comprises configuring a power conversion system to operate in a discontinuous conduction mode, wherein the power conversion system comprises a power conversion apparatus connected between an input voltage bus and an output voltage bus, and a controller electrically coupled to the power conversion apparatus, detecting a switching frequency of the power conversion apparatus, and turning on a low-side switch of the power conversion apparatus once the switching frequency of the power conversion apparatus is less than a predetermined audio frequency threshold.

In accordance with another aspect of the present disclosure, a method comprises configuring a power conversion system to operate in a discontinuous conduction mode, wherein the power conversion system comprises a power conversion apparatus connected between an input voltage bus and an output voltage bus, and a controller electrically coupled to the power conversion apparatus, and based on a predetermined upper audio frequency threshold and a predetermined lower audio frequency threshold, controlling a low-side switch of the power conversion apparatus such that a switching frequency of the power conversion apparatus is maintained outside of a predetermined audio frequency band.

In accordance with another aspect of the present disclosure, a power conversion system comprises a power conversion apparatus connected between an input voltage bus and an output voltage bus, and a controller configured to detect a switching frequency of the power conversion apparatus, and turn on a low-side switch of the power conversion apparatus once the switching frequency of the power conversion apparatus is less than a predetermined audio frequency threshold.

The foregoing has outlined rather broadly the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of embodiments of this disclosure are discussed in detail below. It should be appreciated, however, that the concepts disclosed herein can be embodied in a wide variety of specific contexts, and that the specific embodiments discussed herein are merely illustrative and do not serve to limit the scope of the claims. Further, it should be understood that various changes, substitutions and alterations can be made herein without departing from the spirit and scope of this disclosure as defined by the appended claims.

Further, one or more features from one or more of the following described embodiments may be combined to create alternative embodiments not explicitly described, and features suitable for such combinations are understood to be within the scope of this disclosure. It is therefore intended that the appended claims encompass any such modifications or embodiments.

The present disclosure will be described with respect to embodiments in a specific context, namely a control method for reducing audible noise in a step-down power converter. The disclosure may also be applied, however, to a variety of power conversions systems. Hereinafter, various embodiments will be explained in detail with reference to the accompanying drawings.

Figure 1:
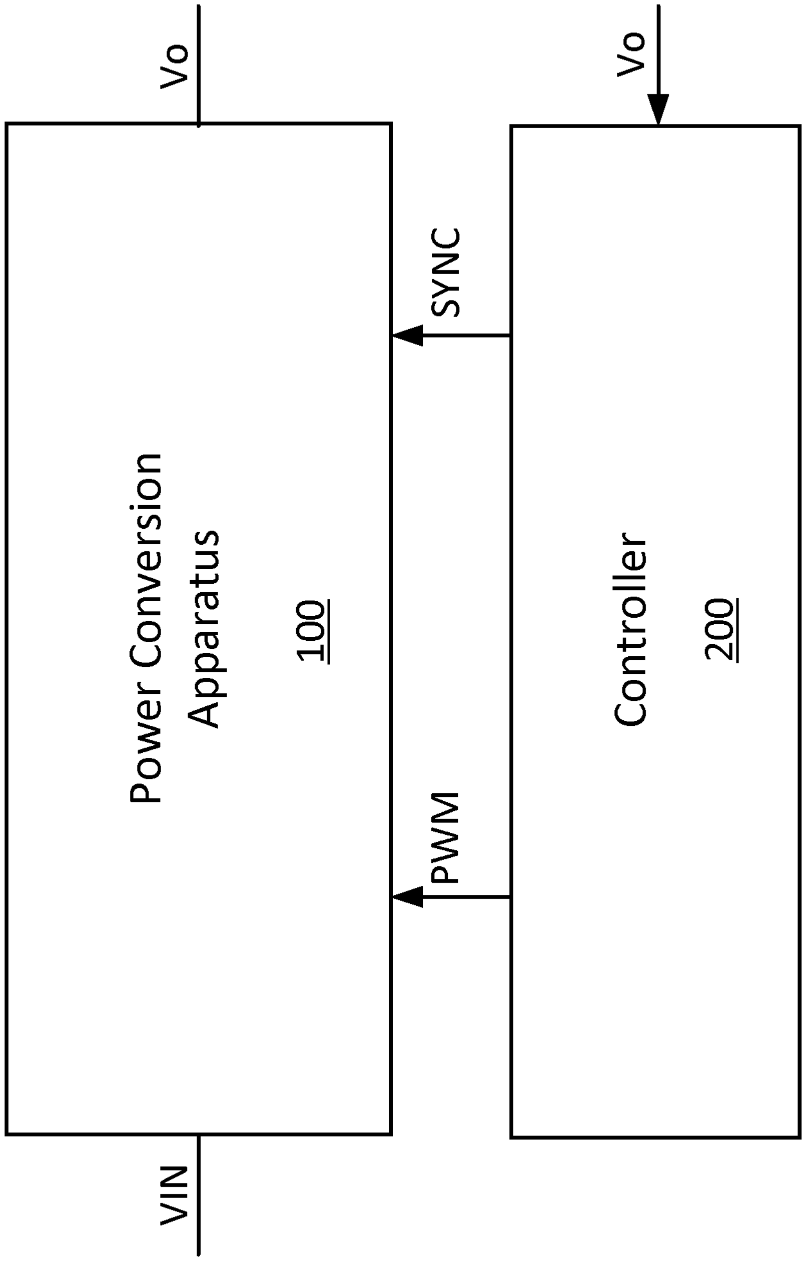
FIG. 1 illustrates a block diagram of a power conversion system in accordance with various embodiments of the present disclosure.

FIG. 1 illustrates a block diagram of a power conversion system in accordance with various embodiments of the present disclosure. The power conversion system comprises a power conversion apparatus 100 and a controller 200. As shown in FIG. 1, the power conversion apparatus 100 is connected between an input voltage bus VIN and an output voltage bus Vo. A load (not shown) is coupled to the output voltage bus Vo. In some embodiments, the load may be a processor (e.g., a central processing unit).

In some embodiments, the power conversion apparatus 100 is implemented as a step-down power converter. The step-down power converter is formed by a smart power stage and an output filter. The smart power stage comprises both high-side and low-side power switches responsible for regulating the output voltage of the step-down power converter. The smart power stage also includes the gate driver circuitry that controls the high-side and low-side power switches, optimizing the switching operation for speed and efficiency. The smart power stage may further comprise other key components such as current sensing, temperature sensing, overcurrent protection, overvoltage protection, under-voltage protection and various digital communication interfaces. The detailed structure of the smart power stage will be described below with respect to FIG. 2. Alternatively, the power conversion apparatus 100 may be implemented as any suitable power converters such as an inductor-inductor-capacitor (LLC) converter, a switched capacitor converter, a hybrid switched capacitor converter, a full bridge power converter, a half bridge power converter, a buck converter, any combinations thereof and the like.

As shown in FIG. 1, the controller 200 is coupled to the power conversion apparatus 100. In particular, the controller 200 is configured to generate a PWM signal and a synchronization signal (SYNC) for controlling the power conversion apparatus 100. The frequency of the PWM signal represents the switching frequency of the power conversion apparatus 100. In operation, based on the output voltage Vo, the controller 200 generates the PWM signal for the power conversion apparatus 100 so as to regulate the output voltage Vo.

In some embodiments, the controller 200 may be a system controller or a system control apparatus. The controller 200 may be implemented as a microprocessor, a digital signal processor and the like.

In some embodiments, the controller 200 comprises a counter. The counter is controlled by a digital clock (e.g., a 4 MHz digital clock). The counter is implemented as a register or a memory element that stores a binary number. This number is updated in response to the clock pulses. For example, with each clock pulse, the counter may increase (increment) its value by 1. This counter is employed to measure time intervals.

In operation, in order to prevent the power conversion system from entering into the audio frequency range. An audio frequency threshold (e.g., 32 kHz) is predetermined. When the switching frequency of the power conversion system falls below the reference frequency, the controller 200 sends a SYNC signal having a logic high state to the power conversion apparatus 100. In response to the logic high state of the SYNC signal, a low-side power switch of the power conversion apparatus 100 is turned on. Activating the low-side power switch discharges the output voltage Vo, causing the next on-time pulse (PWM signal) to be generated earlier than it would have without this control method. As a result, the time interval between consecutive on-time pulses of the high-side switch is shortened, increasing the switching frequency and ensuring it remains above the audio frequency range.

At least two control methods can be used to mitigate the audible noise generated by the power conversion system shown in FIG. 1.

In a first implementation of the control methods, the switching frequency of the power conversion apparatus 100 is detected through the counter. The low-side switch is turned on once the switching frequency of the power conversion apparatus 100 is less than a predetermined audio frequency threshold. In some embodiments, the predetermined audio frequency threshold is set at 32 kHz. The counter is driven by a 4 MHz clock. The counter is employed to measure the time interval between two consecutive on-time pulses of the PWM signal. This time interval directly indicates the frequency of the power conversion apparatus 100, as the frequency can be calculated by taking the reciprocal of the time interval. In terms of the clock having a frequency of 4 MHz, the 32 kHz frequency threshold corresponds to 125 clock cycles.

During operation, the counter starts counting from the leading edge of the PWM signal and continues until the leading edge of the PWM signal appears again. If the counter exceeds 125 cycles during this process, it indicates that the switching frequency of the power conversion apparatus 100 has reached 32 kHz. Based on the output of the counter, the controller 200 can determine whether the switching frequency of the power conversion apparatus 100 has dropped below the predetermined audio frequency threshold of 32 kHz. Once the output of the counter is greater than 125, the controller 200 is configured to generate a synchronization signal having a logic high state. In response to a leading edge of the synchronization signal, the low-side switch of the power conversion apparatus 100 is turned on. The low-side switch is configured to remain on to discharge an output voltage of the power conversion apparatus 100 until the control loop of the power conversion system is configured to turn on the high-side switch of the power conversion apparatus 100. In response to a turn-on of the high-side switch, the synchronization signal and the counter are reset.

One advantageous feature of the first implementation above is that the low-side switch of the power conversion apparatus 100 is deliberately turned on to ensure that the switching frequency of the power conversion apparatus 100 remains above the audio frequency range, thereby preventing the generation of audible noise while maintaining efficient voltage regulation in light load conditions. This approach ensures that the benefits of constant on-time control are maintained without compromising the acoustic performance of the power conversion system.

The second implementation of the control methods is similar to the first implementation described above except that a trial-and-error approach is employed to further improve the efficiency of the power conversion system. More particularly, a predetermined upper audio frequency threshold and a predetermined lower audio frequency threshold are employed to control the low-side switch of the power conversion apparatus 100 such that the switching frequency of the power conversion apparatus 100 is maintained outside of the audio frequency band.

The audio frequency band is in a range from about 20 Hz to about 20 kHz. The predetermined upper audio frequency threshold is M1 kHz greater than 20 kHz. In some embodiments, the predetermined upper audio frequency threshold is equal to 32 kHz. The predetermined lower audio frequency threshold is M2 Hz less than 20 Hz. In some embodiments, the predetermined lower audio frequency threshold is equal to 16 Hz. The counter has a clock frequency of 4 MHz.

In operation, once the power conversion system operates in the discontinuous conduction mode, the counter starts a first counting process. In the first counting process, the controller 200 determines whether the output of the counter falls within a range of from $N\times10^3/M1$ (125) to $N\times10^6/M2$ (250,000). Upon detecting that the output of the counter falls within this range, in subsequent counting processes after the first counting process, the controller 200 generates a synchronization signal having a logic high state once the output of the counter is equal to $N\times10^3/M1$ (125). In response to a leading edge of the synchronization signal, the low-side switch of the power conversion apparatus 100 is turned on. The low-side switch is configured to remain on to discharge an output voltage of the power conversion apparatus 100 until the high-side switch of the power conversion apparatus 100 is turned on. In response to a turn-on of the high-side switch, the synchronization signal and the counter are reset.

In a trial-and-error approach, after a predetermined number of counting processes, the controller 200 once again determines whether the output of the counter falls within the range of from $N\times10^3/M1$ (125) to $N\times10^6/M2$ (250,000). When the output of the counter falls within this range, in subsequent counting processes, the controller 200 generates a synchronization signal having a logic high state once the output of the counter is equal to $N\times10^3/M1$ (125). On the other hand, when the output of the counter is outside of this range (the output is less than 125 or greater than 250,000), the controller 200 configures the counter to repeat the step of determining whether the output of the counter falls within this range in subsequent counting processes.

One advantageous feature of the second implementation above is that in some applications having a switching frequency less than the predetermined lower audio frequency threshold (e.g., 16 Hz), this trial-and-error approach can help further reduce the switching losses of the power conversion apparatus 100.

Figure 2:
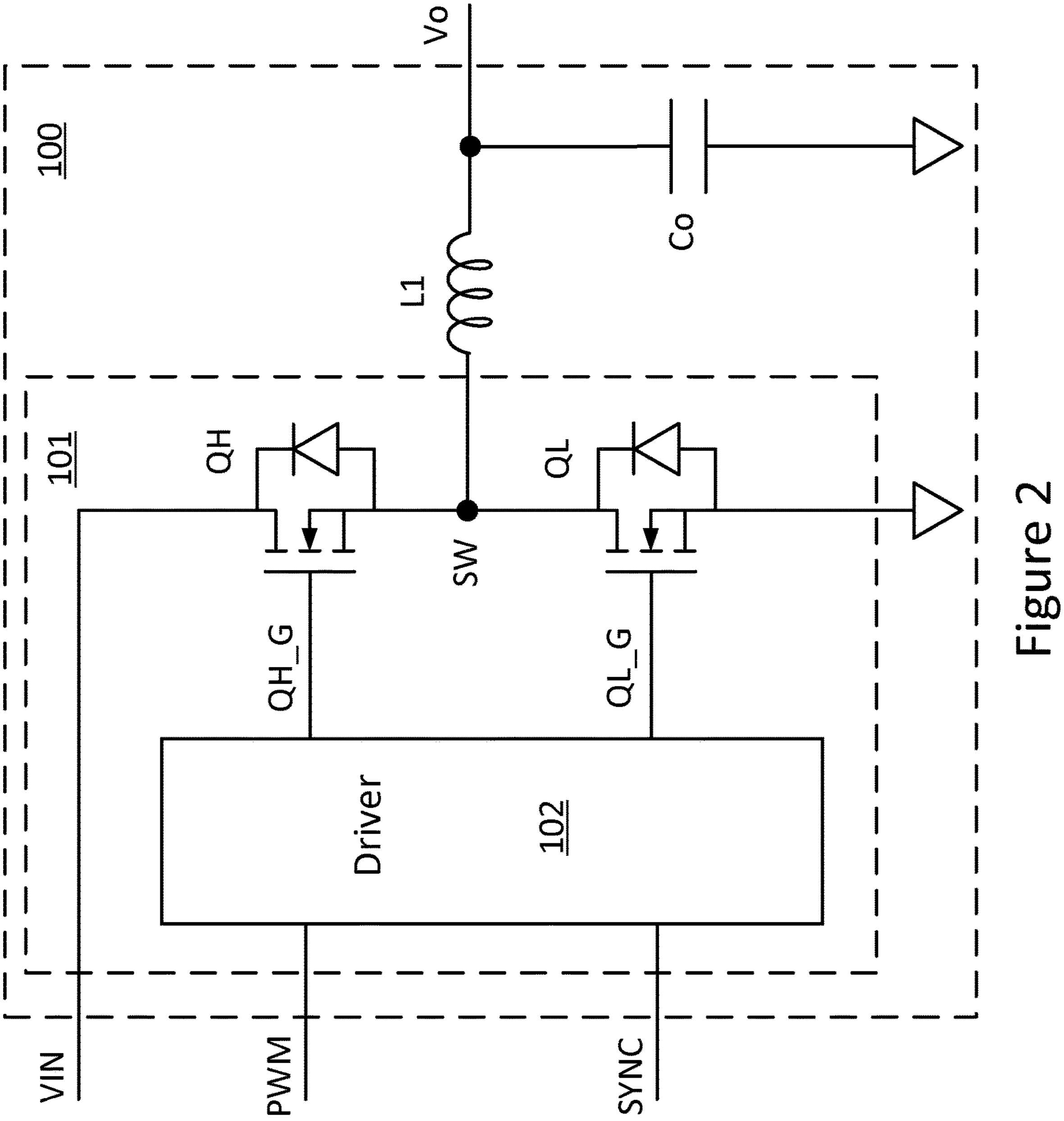
FIG. 2 illustrates a schematic diagram of the power conversion apparatus shown in FIG. 1 in accordance with various embodiments of the present disclosure.

FIG. 2 illustrates a schematic diagram of the power conversion apparatus shown in FIG. 1 in accordance with various embodiments of the present disclosure. The power conversion apparatus 100 comprises a step-down power converter and a driver 102. The step-down power converter comprises a high-side switch QH, a low-side switch QL, an output inductor L1 and an output capacitor Co. As shown in FIG. 2, the high-side switch QH and the low-side switch QL are connected in series between the input voltage bus VIN and ground. The output inductor L1 is connected between a common node (SW) of the high-side switch QH and the low-side switch QL, and the output voltage bus Vo. The output capacitor Co is connected between the output voltage bus Vo and ground. The driver 102 is configured to receive a PWM signal and a synchronization signal from the controller. Based on the received signals, the driver 102 generates gate drive signals QH_G and QL_G for the high-side switch QH and the low-side switch QL, respectively. In some embodiments, the high-side switch QH, the low-side switch QL and the driver 102 are in a smart power stage semiconductor package 101.

In operation, when the high-side switch QH is turned on, and the low-side switch QL is turned off, a current flows from the input voltage VIN to the load through the output inductor L1. The output inductor L1 opposes sudden changes in current by storing energy in its magnetic field. The output capacitor Co supplies the load with current, smoothing out the output voltage Vo. When the high-side switch QH is turned off, and the low-side switch QL is turned on, the output inductor L1 releases its stored energy to maintain the current flow to the load. The output capacitor Co continues to smooth the output voltage. In operation, the duty cycle (the ratio of the turn-on time of the high-side switch QH to the total switching period) is used to control the output voltage Vo. By adjusting the duty cycle, the output voltage Vo can be regulated at a predetermined level.

In accordance with an embodiment, the switches (e.g., switches QH and QL) may be metal oxide semiconductor field-effect transistor (MOSFET) devices. Alternatively, the switches can be any controllable switches such as insulated gate bipolar transistor (IGBT) devices, integrated gate commutated thyristor (IGCT) devices, gate turn-off thyristor (GTO) devices, silicon controlled rectifier (SCR) devices, junction gate field-effect transistor (JFET) devices, MOS controlled thyristor (MCT) devices, gallium nitride (GaN)-based power devices, silicon carbide (SiC)-based power devices and the like.

It should be noted while FIG. 2 shows the switches QH and QL are implemented as single n-type transistors, a person skilled in the art would recognize there may be many variations, modifications and alternatives. For example, depending on different applications and design needs, the switches QH and QL may be implemented as p-type transistors. Furthermore, each switch shown in FIG. 2 may be implemented as a plurality of switches connected in parallel. Moreover, a capacitor may be connected in parallel with one switch to achieve zero voltage switching (ZVS)/zero current switching (ZCS).

Figure 3:
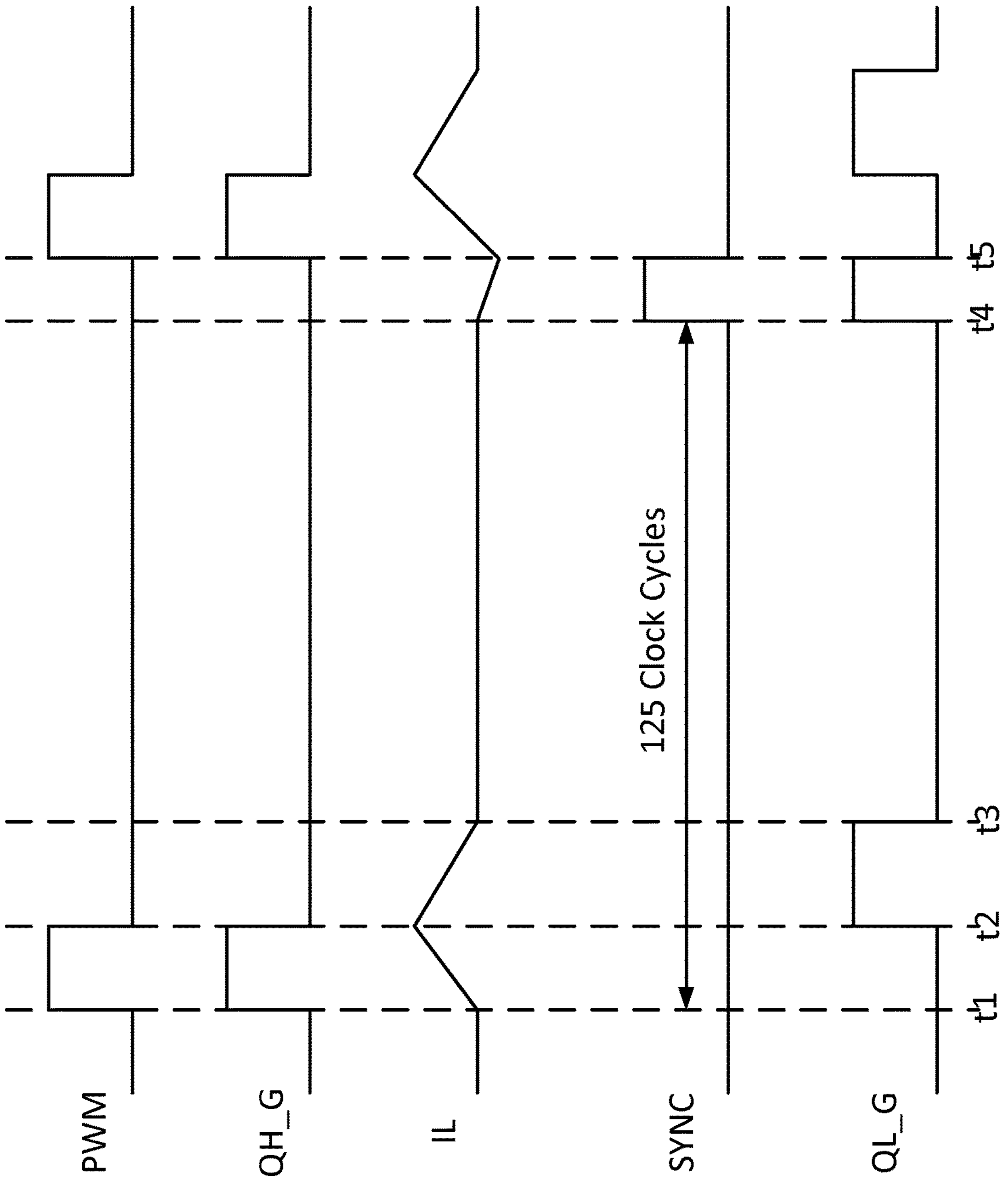
FIG. 3 illustrates various signals associated with the power conversion system shown in FIG. 2 in accordance with various embodiments of the present disclosure.

FIG. 3 illustrates various signals associated with the power conversion system shown in FIG. 2 in accordance with various embodiments of the present disclosure. The horizontal axis represents intervals of time. There are five rows. The first row represents the PWM signal. The second row represents the gate drive signal (QH_G) of the high-side switch. The third row represents the current (IL) flowing through the inductor of the power conversion apparatus. The fourth row represents the synchronization signal (SYNC). The fifth row represents the gate drive signal of the low-side switch (QL_G).

At t1, in response to the leading edge of the PWM signal, the gate drive signal of the high-side switch changes from a logic low state to a logic high state. In response to this change, the high-side switch QH is turned on. The current flowing through the inductor L1 increases in a linear manner from t1 to t2. The counter starts counting from the leading edge of the PWM signal. The counter continues counting until the leading edge of the PWM signal appears again (e.g., t5).

At t2, the high-side switch QH is turned off, and the low-side switch QL is turned on. The current flowing through the inductor L1 decreases in a linear manner from t2 to t3. As shown in FIG. 3, at t3, the current flowing through the inductor reaches zero. The low-side switch QL is turned off. From t3, the power conversion system operates in the discontinuous conduction mode. From t3 to t4, both the high-side switch QH and the low-side switch QL are turned off.

At t4, the output of the counter reaches 125. This indicates the switching frequency of the power conversion apparatus is approximately equal to 32 kHz. If the switches remain off, the switching frequency of the power conversion apparatus will drop below 32 kHz. In order to prevent the power conversion apparatus from operating in the audio frequency band, at t4, the controller 200 generates a synchronization signal having a logic high state. Such a logic high state of the synchronization signal configures the power conversion apparatus to operate in the synchronization mode. In response to the synchronization mode, the low-side switch QL is turned on at t4. As shown in FIG. 3, the turn-on of the low-side switch QL causes the current flowing through the inductor to further decrease from zero to a negative value. From t4 to t5, the current flowing through the inductor is a negative current. The output voltage of the power conversion system is discharged by this negative current. At t5, the output voltage of the power conversion system drops below a predetermined reference voltage. The feedback loop of the power conversion system turns on the high-side switch QH at t5 to maintain voltage regulation. In response to the leading edge of the gate drive signal of the high-side switch QH, both the SYNC signal and the counter are reset at t5. Afte t5, the process described above is repeated.

Figure 4:
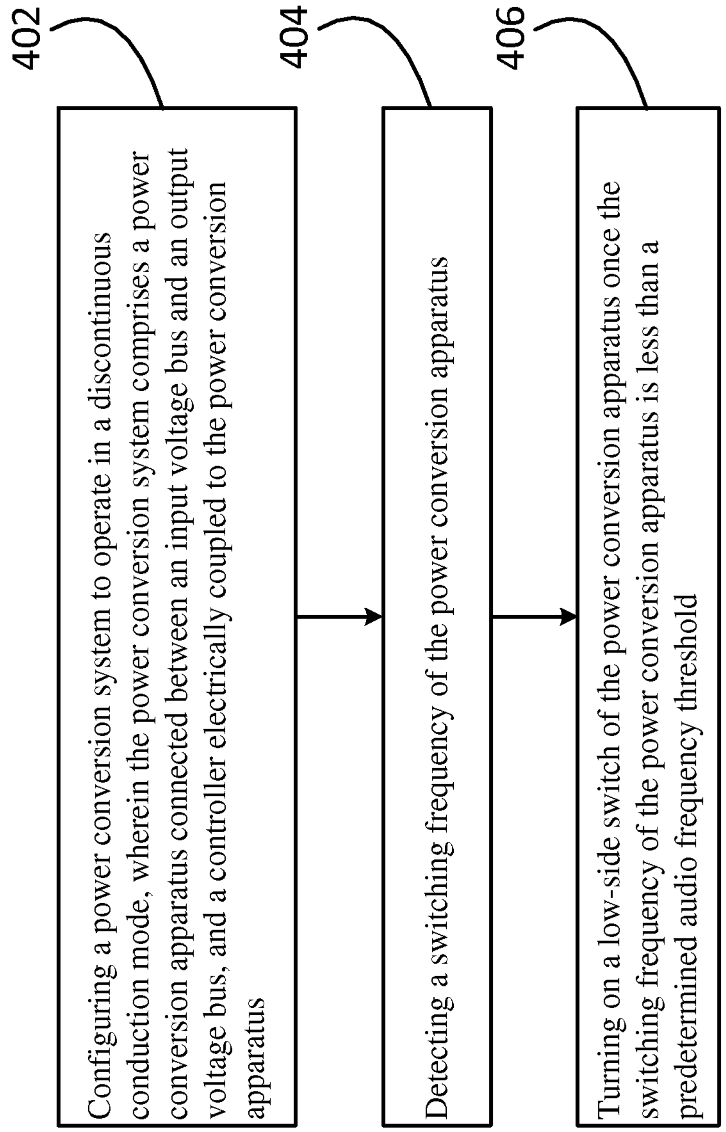
FIG. 4 illustrates a flow chart of a first method for controlling the power conversion system shown in FIG. 1 in accordance with various embodiments of the present disclosure.

FIG. 4 illustrates a flow chart of a first method for controlling the power conversion system shown in FIG. 1 in accordance with various embodiments of the present disclosure. This flowchart shown in FIG. 4 is merely an example, which should not unduly limit the scope of the claims. One of ordinary skill in the art would recognize many variations, alternatives, and modifications. For example, various steps illustrated in FIG. 4 may be added, removed, replaced, rearranged and repeated.

At step 402, a power conversion system is configured to operate in a discontinuous conduction mode. The power conversion system comprises a power conversion apparatus connected between an input voltage bus and an output voltage bus, and a controller electrically coupled to the power conversion apparatus.

At step 404, a switching frequency of the power conversion apparatus is detected.

At step 406, a low-side switch of the power conversion apparatus is turned on once the switching frequency of the power conversion apparatus is less than a predetermined audio frequency threshold.

The method further comprises prior to turning on the low-side switch, generating, by the controller, a synchronization signal having a logic high state, and in response to a leading edge of the synchronization signal, the low-side switch is turned on.

The method further comprises configuring the low-side switch to remain on until a control loop of the power conversion system is configured to turn on a high-side switch of the power conversion apparatus.

The method further comprises the synchronization signal is reset in response to a leading edge of a turn-on signal of the high-side switch of the power conversion apparatus.

In some embodiments, the power conversion apparatus comprises a step-down power converter and a driver, wherein the step-down power converter comprises a high-side switch and the low-side switch connected in series between the input voltage bus and ground, an output inductor connected between a common node of the high-side switch and the low-side switch, and the output voltage bus, and an output capacitor connected between the output voltage bus and ground, the driver is configured to receive a PWM signal and a synchronization signal from the controller, and generate gate drive signals for the high-side switch and the low-side switch, respectively, and the high-side switch, the low-side switch and the driver are in a smart power stage semiconductor package.

In some embodiments, the predetermined audio frequency threshold is M kHz. The controller comprises a counter having a clock frequency of N MHz, and wherein the counter is employed to detect the switching frequency of the power conversion apparatus. Based on an output of the counter, the controller is configured to determine whether the switching frequency of the power conversion apparatus is less than the predetermined audio frequency threshold.

The method further comprises configuring the counter to initiate counting from a leading edge of the PWM signal, and configuring the counter to continue counting until the leading edge of the PWM signal reoccurs, wherein during a counting process, the output of the counter increments by 1 after each clock period.

The method further comprises generating a synchronization signal having a logic high state once the output of the counter is equal to $N \times 1000/M$, and in response to a leading edge of the synchronization signal, turning on the low-side switch.

The method further comprises configuring the low-side switch to remain on to discharge an output voltage of the power conversion apparatus, configuring the high-side switch to be turned on once the output voltage of the power conversion apparatus falls below a predetermined voltage reference, and in response to a turn-on of the high-side switch, resetting the synchronization signal and the counter.

In some embodiments, M is equal to 32 and the predetermined audio frequency threshold is 32 kHz. N is equal to 4 and the clock frequency is 4 MHz.

Figure 5:
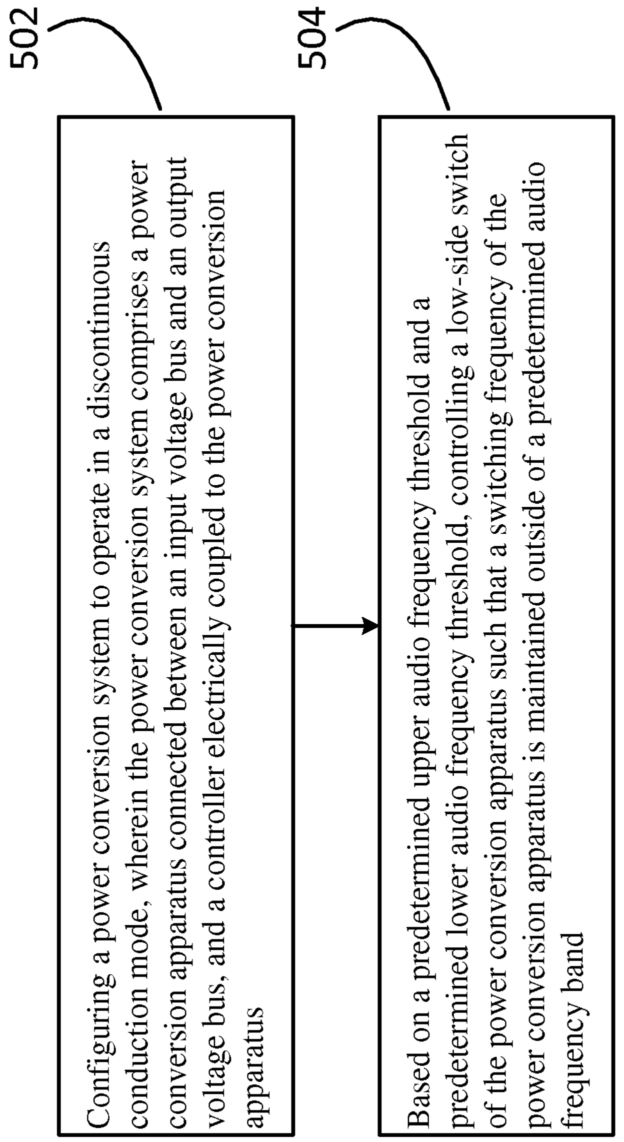
FIG. 5 illustrates a flow chart of a second method for controlling the power conversion system shown in FIG. 1 in accordance with various embodiments of the present disclosure.

FIG. 5 illustrates a flow chart of a second method for controlling the power conversion system shown in FIG. 1 in accordance with various embodiments of the present disclosure. This flowchart shown in FIG. 5 is merely an example, which should not unduly limit the scope of the claims. One of ordinary skill in the art would recognize many variations, alternatives, and modifications. For example, various steps illustrated in FIG. 5 may be added, removed, replaced, rearranged and repeated.

At step 502, a power conversion system is configured to operate in a discontinuous conduction mode, wherein the power conversion system comprises a power conversion apparatus connected between an input voltage bus and an output voltage bus, and a controller electrically coupled to the power conversion apparatus.

At step 504, based on a predetermined upper audio frequency threshold and a predetermined lower audio frequency threshold, a low-side switch of the power conversion apparatus is controlled such that a switching frequency of the power conversion apparatus is maintained outside of a predetermined audio frequency band.

In some embodiments, the predetermined audio frequency band is in a range from about 20 Hz to about 20 kHz, and wherein the predetermined upper audio frequency threshold is M1 kHz greater than 20 kHz, and the predetermined lower audio frequency threshold is M2 Hz less than 20 Hz.

The method further comprises starting a counting process by a counter from a leading edge of a PWM signal generated by the controller, wherein the counter has a clock frequency of N MHz, increasing an output of the counter by 1 after each clock period, based on the output of the counter, determining, by a controller, whether the switching frequency of the power conversion apparatus is maintained outside of the predetermined audio frequency band, and resetting the counter once the leading edge of the PWM signal appears again.

The method further comprises once the power conversion system operates in the discontinuous conduction mode, starting a first counting process by the counter, in the first counting process, determining whether the output of the counter falls within a range of from $N\times10^3/M1$ to $N\times10^6/M2$, and upon detecting that the output of the counter falls within the range of from $N\times10^3/M1$ to $N\times10^6/M2$, in subsequent counting processes after the first counting process, generating a synchronization signal having a logic high state once the output of the counter is equal to $N\times10^3/M1$.

The method further comprises in response to a leading edge of the synchronization signal, turning on the low-side switch, configuring the low-side switch to remain on to discharge an output voltage of the power conversion apparatus, configuring the high-side switch to be turned on once the output voltage of the power conversion apparatus falls below a predetermined voltage reference, and in response to a turn-on of the high-side switch, resetting the synchronization signal and the counter.

The method further comprises after a predetermined number of counting processes, determining whether the output of the counter falls within the range of from $N\times10^3/M1$ to $N\times10^6/M2$, wherein when the output of the counter falls within the range of from $N\times10^3/M1$ to $N\times10^6/M2$, in subsequent counting processes, the controller generates the synchronization signal having the logic high state once the output of the counter is equal to $N\times10^3/M1$, and when the output of the counter is outside of the range of from $N\times10^3/M1$ to $N\times10^6/M2$, the controller configures the counter to repeat the step of determining whether the output of the counter falls within the range of from $N\times10^3/M1$ to $N\times10^6/M2$.

In some embodiments, the power conversion apparatus comprises a step-down power converter and a driver, wherein the step-down power converter comprises a high-side switch and the low-side switch connected in series between the input voltage bus and ground, an output inductor connected between a common node of the high-side switch and the low-side switch, and the output voltage bus, and an output capacitor connected between the output voltage bus and ground, the driver is configured to receive a PWM signal and a synchronization signal from the controller, and generate gate drive signals for the high-side switch and the low-side switch, respectively, the high-side switch, the low-side switch and the driver are in a smart power stage semiconductor package, M1 is equal to 32 and the predetermined upper audio frequency threshold is 32 kHz, M2 is equal to 16 and the predetermined lower audio frequency threshold is 16 Hz, and N is equal to 4 and the clock frequency is 4 MHz.

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, which may perform substantially the same function or achieve substantially the same result as the corresponding embodiments described herein, may be utilized according to the present disclosure. Accordingly, the appended claims are intended to include within their scope such processes, machines, manufacture, compositions of matter, means, methods, or steps.

What is claimed is:

1. A method comprising:

configuring a power conversion system to operate in a discontinuous conduction mode, wherein the power conversion system comprises a power conversion apparatus connected between an input voltage bus and an output voltage bus, and a controller electrically coupled to the power conversion apparatus;

detecting a switching frequency of the power conversion apparatus; and turning on a low-side switch of the power conversion apparatus once the switching frequency of the power conversion apparatus is less than a predetermined audio frequency threshold.

2. The method of claim 1, further comprising:

prior to turning on the low-side switch, generating, by the controller, a synchronization signal having a logic high state; and in response to a leading edge of the synchronization signal, the low-side switch is turned on.

3. The method of claim 2, further comprising:

configuring the low-side switch to remain on until a control loop of the power conversion system is configured to turn on a high-side switch of the power conversion apparatus.

4. The method of claim 3, further comprising:

the synchronization signal is reset in response to a leading edge of a turn-on signal of the high-side switch of the power conversion apparatus.

5. The method of claim 1, wherein:

the power conversion apparatus comprises a step-down power converter and a driver, wherein the step-down power converter comprises:

a high-side switch and the low-side switch connected in series between the input voltage bus and ground;

an output inductor connected between a common node of the high-side switch and the low-side switch, and the output voltage bus; and an output capacitor connected between the output voltage bus and ground;

the driver is configured to receive a PWM signal and a synchronization signal from the controller, and generate gate drive signals for the high-side switch and the low-side switch, respectively; and the high-side switch, the low-side switch and the driver are in a smart power stage semiconductor package.

6. The method of claim 5, wherein:

the predetermined audio frequency threshold is M kHz;

the controller comprises a counter having a clock frequency of N MHz, and wherein the counter is employed to detect the switching frequency of the power conversion apparatus; and based on an output of the counter, the controller is configured to determine whether the switching frequency of the power conversion apparatus is less than the predetermined audio frequency threshold.

7. The method of claim 6, further comprising:

configuring the counter to initiate counting from a leading edge of the PWM signal; and configuring the counter to continue counting until the leading edge of the PWM signal reoccurs, wherein during a counting process, the output of the counter increments by 1 after each clock period.

8. The method of claim 7, further comprising:

generating the synchronization signal having a logic high state once the output of the counter is equal to $N \times 1000/M$; and in response to a leading edge of the synchronization signal, turning on the low-side switch.

9. The method of claim 8, further comprising:

configuring the low-side switch to remain on to discharge an output voltage of the power conversion apparatus;

configuring the high-side switch to be turned on once the output voltage of the power conversion apparatus falls below a predetermined voltage reference; and in response to a turn-on of the high-side switch, resetting the synchronization signal and the counter.

10. The method of claim 6, wherein:

M is equal to 32, and the predetermined audio frequency threshold is 32 kHz; and N is equal to 4, and the clock frequency is 4 MHz.

11. A method comprising:

configuring a power conversion system to operate in a discontinuous conduction mode, wherein the power conversion system comprises a power conversion apparatus connected between an input voltage bus and an output voltage bus, and a controller electrically coupled to the power conversion apparatus; and based on a predetermined upper audio frequency threshold and a predetermined lower audio frequency threshold, controlling a low-side switch of the power conversion apparatus such that a switching frequency of the power conversion apparatus is maintained outside of a predetermined audio frequency band.

12. The method of claim 11, wherein:

the predetermined audio frequency band is in a range from about 20 Hz to about 20 kHz, and wherein:

the predetermined upper audio frequency threshold is M1 kHz greater than 20 kHz; and the predetermined lower audio frequency threshold is M2 Hz less than 20 Hz.

13. The method of claim 12, further comprising:

starting a counting process by a counter from a leading edge of a PWM signal generated by the controller, wherein the counter has a clock frequency of N MHz;

increasing an output of the counter by 1 after each clock period;

based on the output of the counter, determining, by the controller, whether the switching frequency of the power conversion apparatus is maintained outside of the predetermined audio frequency band; and resetting the counter once the leading edge of the PWM signal appears again.

14. The method of claim 13, further comprising:

once the power conversion system operates in the discontinuous conduction mode, starting a first counting process by the counter;

in the first counting process, determining whether the output of the counter falls within a range of from $N \times 10^3/M1$ to $N \times 10^6/M2$; and upon detecting that the output of the counter falls within the range of from $N \times 10^3/M1$ to $N \times 10^6/M2$, in subsequent counting processes after the first counting process, generating a synchronization signal having a logic high state once the output of the counter is equal to $N \times 10^3/M1$.

15. The method of claim 14, further comprising:

in response to a leading edge of the synchronization signal, turning on the low-side switch;

configuring the low-side switch to remain on to discharge an output voltage of the power conversion apparatus;

configuring the high-side switch to be turned on once the output voltage of the power conversion apparatus falls below a predetermined voltage reference; and in response to the turn-on of the high-side switch, resetting the synchronization signal and the counter.

16. The method of claim 14, further comprising:

after a predetermined number of counting processes, determining whether the output of the counter falls within the range of from $N \times 10^3/M1$ to $N \times 10^6/M2$, wherein:

when the output of the counter falls within the range of from $N \times 10^3/M1$ to $N \times 10^6/M2$, in subsequent counting processes, the controller generates the synchronization signal having the logic high state once the output of the counter is equal to $N \times 10^3/M1$; and when the output of the counter is outside of the range of from $N \times 10^3/M1$ to $N \times 10^6/M2$, the controller configures the counter to repeat the step of determining whether the output of the counter falls within the range of from $N \times 10^3/M1$ to $N \times 10^6/M2$.

17. The method of claim 13, wherein:

the power conversion apparatus comprises a step-down power converter and a driver, wherein the step-down power converter comprises:

a high-side switch and the low-side switch connected in series between the input voltage bus and ground;

an output inductor connected between a common node of the high-side switch and the low-side switch, and the output voltage bus; and an output capacitor connected between the output voltage bus and ground;

the driver is configured to receive a PWM signal and a synchronization signal from the controller, and generate gate drive signals for the high-side switch and the low-side switch, respectively;

the high-side switch, the low-side switch and the driver are in a smart power stage semiconductor package;

M1 is equal to 32, and the predetermined upper audio frequency threshold is 32 kHz;

M2 is equal to 16, and the predetermined lower audio frequency threshold is 16 Hz; and N is equal to 4, and the clock frequency is 4 MHZ.

18. A power conversion system comprising:

a power conversion apparatus connected between an input voltage bus and an output voltage bus; and a controller configured to:

detect a switching frequency of the power conversion apparatus; and turn on a low-side switch of the power conversion apparatus once the switching frequency of the power conversion apparatus is less than a predetermined audio frequency threshold.

19. The power conversion system of claim 18, wherein:

the predetermined audio frequency threshold is M kHz;

the controller comprises a counter having a clock frequency of N MHz, and wherein the counter is employed to detect the switching frequency of the power conversion apparatus; and the controller is configured to:

configure the counter to initiate counting from a leading edge of a PWM signal generated by the controller;

configure the counter to continue counting until the leading edge of the PWM signal appears again, wherein during a counting process, an output of the counter increments by 1 after each clock period;

generate a synchronization signal having a logic high state once the output of the counter is equal to N×1000/M;

turn on the low-side switch in response to a leading edge of the synchronization signal;

configure the low-side switch to remain on to discharge an output voltage of the power conversion apparatus;

configure the high-side switch to be turned on once the output voltage of the power conversion apparatus falls below a predetermined voltage reference; and reset the synchronization signal and the counter in response to a turn-on of the high-side switch.

20. The power conversion system of claim 19, wherein:

the power conversion apparatus comprises a step-down power converter and a driver, wherein the step-down power converter comprises:

a high-side switch and the low-side switch connected in series between the input voltage bus and ground;

an output inductor connected between a common node of the high-side switch and the low-side switch, and the output voltage bus; and an output capacitor connected between the output voltage bus and ground;

the driver is configured to receive a PWM signal and a synchronization signal from the controller, and generate gate drive signals for the high-side switch and the low-side switch, respectively;

the high-side switch, the low-side switch and the driver are in a smart power stage semiconductor package;

M is equal to 32, and the predetermined audio frequency threshold is 32 kHz; and N is equal to 4, and the clock frequency is 4 MHz.

* * * * *